(No Model.)
C. P. GREGORY.
BIT FOR HORSES.
No. 444,425.   Patented Jan. 13, 1891.
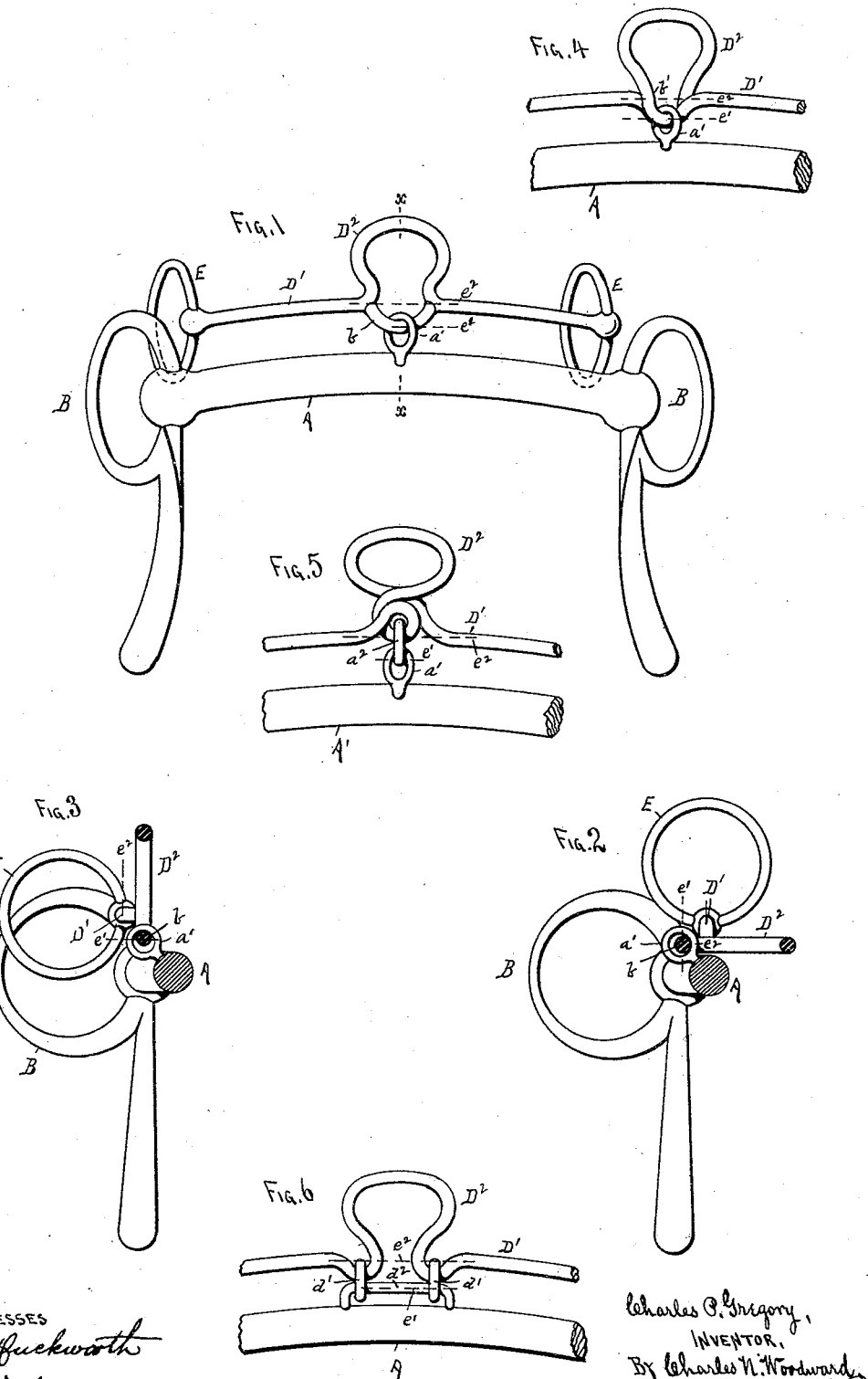

UNITED STATES PATENT OFFICE.

CHARLES P. GREGORY, OF STILLWATER, MINNESOTA.

BIT FOR HORSES.

SPECIFICATION forming part of Letters Patent No. 444,425, dated January 13, 1891.

Application filed August 7, 1890. Serial No. 361,337. (No model.)

*To all whom it may concern:*

Be it known that I, CHARLES P. GREGORY, a citizen of the United States, residing at Stillwater, in the county of Washington and State of Minnesota, have invented certain new and useful Improvements in Bits for Horses, of which the following is a specification.

This invention relates to the bits for horses; and it consists in the construction and arrangement of parts, as hereinafter shown and described, and specifically pointed out in the claims.

In the drawings, Figure 1 is a perspective view of the bit complete. Fig. 2 is a cross-section on the line $x\,x$ of Fig. 1, showing the "overcheck-bar" depressed or in its normal position; and Fig. 3 is a similar view showing the overcheck-bar elevated or in the position it will occupy when in operation. Figs. 4, 5, and 6 are detail views showing modifications in the manner of connecting the overcheck-bit to the main bit.

A represents the "snaffle" or main bit, and B the rings to which the reins are attached, these parts being of the ordinary construction.

$D'$ is an overcheck-bit, formed with a large loop $D^2$ at its center and adapted to be so connected to the main bit or snaffle A as to be free to turn thereon, but without end movement and with the pivotal point of the connection between the main bit and the overcheck-bit, so that any attempt of the horse to move his head downward will cause the loop on the overcheck-bit to be turned upward against the roof of the mouth, as hereinafter more fully explained. I have shown several methods by which this connection may be made, all being substantially the same and adapted to produce precisely the same result—viz., to permit the overcheck-bar $D'$ to be turned upon the main bit, but without end movement.

In Fig. 1 I have shown an eye $a'$, secured to the center of the main bit A, through which a loop $b$ on the overcheck-bar $D'$ passes.

Rings E are set into the ends of the overcheck-bar $D'$, to which the overcheck-reins are connected in the ordinary manner.

In Fig. 4 the overcheck-bar is merely coiled around itself once and passes through a ring or eye $a'$, the coil being bent slightly at $b'$ to limit to a still greater extent the very slight end movement which might otherwise exist.

In Fig. 5 the coil is of a slightly-different form and with a ring $a^2$ interposed between it and the eye $a'$.

In Fig. 6 the bar $D'$ is bent at its center to form the loop $D^2$, as in Fig. 1, but connected by rings $d'$ to a lateral loop $d^2$ upon the bar A.

As before stated, the pivotal line of the overcheck-bit is between the main bit and the center line of the overcheck-bit. This is indicated more fully by dotted lines $e'\,e^2$, the line $e'$ indicating the pivotal line of the connection between the parts A and $D'$ and the line $e^2$ representing substantially the center line of the overcheck-bit. The overcheck-bit being held upward by the overcheck-reins, it will be readily seen that any downward movement of the horse's head will cause the main bit to be moved downward, thus causing the eyes $a'$ to pull downward on the loop $b$ or other portion of the bit $D'$ below its center line $e^2$ and throw the loop $D^2$ up against the roof of the horse's mouth, which, being a very sensitive portion of the mouth, will at once cause him to elevate his head again in an endeavor to relieve himself of the annoyance, which will at once restore the bit to its normal position, as in Fig. 2. The horse very soon learns that any attempt to throw his head downward causes that annoying sensation in the roof of the mouth, and ceases such movements.

The overcheck-bit $D'$ does not distend the jaws of the horse, as will be seen by noting its two extreme positions in Figs. 2 and 3, the overcheck-bit being merely moved backward a short distance in the mouth.

By connecting the bar $D'$ to the main bit A loosely by the eyes or the rings $a'$ the bar is held from end-play or side movement in the horse's mouth, thereby avoiding the objections of the ordinary overcheck-bit, which is liable to injure the mouth of the horse if the head is thrown violently or suddenly downward.

With my device the loop $D^2$ can only extend upward for a certain distance, no matter how violently the head is thrown down, and cannot move sidewise, except to the very limited extent of the length of the small loop $b$ or the rings $a^2$. Hence the bit controls the horse perfectly and easily and without danger of injury to the mouth or rendering it liable to become sore. By this arrangement, also, the horse cannot get his tongue over the bit or get the bit between his teeth.

I do not wish to be limited to the precise methods shown for connecting the bar D' to the bar A, as I am aware that means other than those shown may be employed to connect them.

Having thus described my invention, what I claim as new is—

In a bridle-bit, the main bit A, an overcheck-bit D', having a central loop D² and connected to said main bit by a flexible joint, the central or pivotal point of said joint being between said overcheck-bit and main bit, whereby any downward movement of the horse's head will cause said overcheck-bit to be oscillated upon said flexible joint and cause said loop to be turned upward, but without materially altering the relative positions of the parts A D', substantially as and for the purpose set forth.

In testimony whereof I have hereunto set my hand in the presence of two subscribing witnesses.

CHARLES P. GREGORY.

Witnesses:
C. N. WOODWARD,
S. H. McKUSICK.